Figure 1:
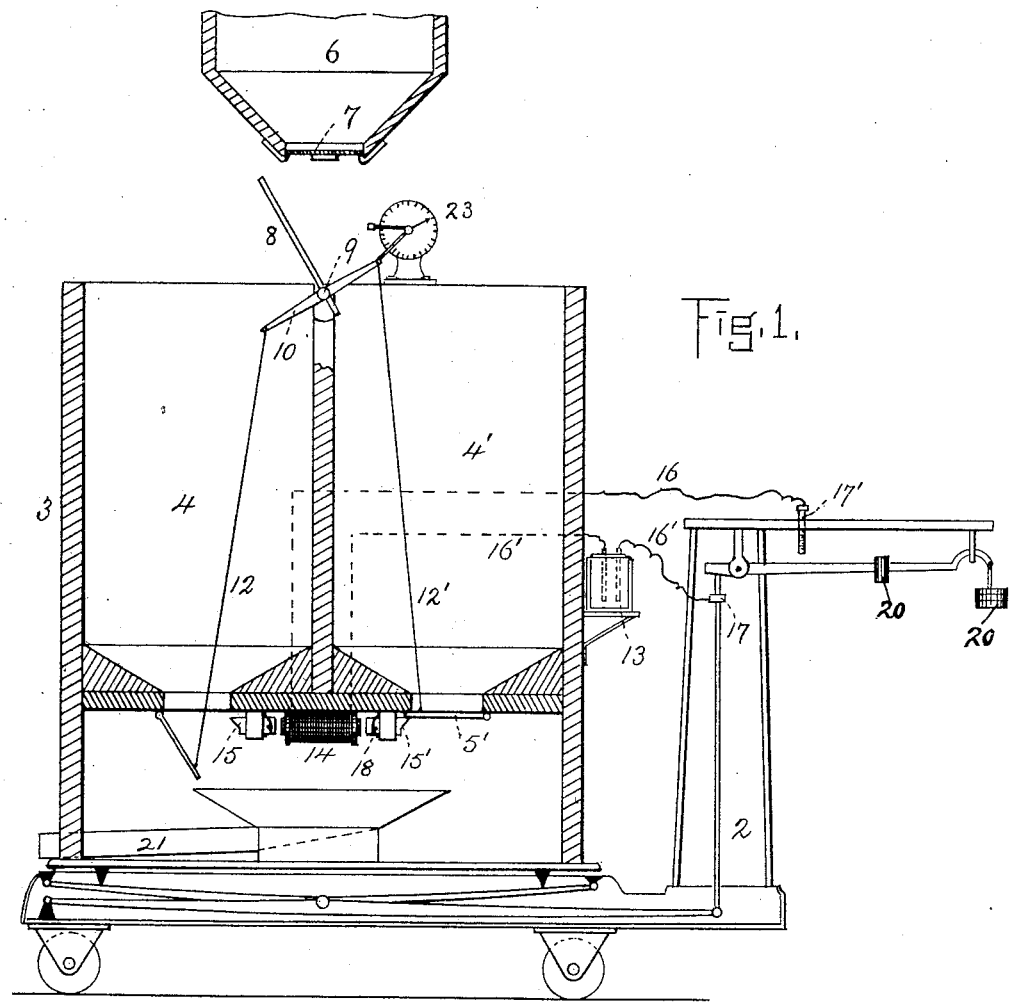

(No Model.) 2 Sheets—Sheet 1.

N. LOMBARD.
AUTOMATIC WEIGHING SCALE.

No. 475,405. Patented May 24, 1892.

Witnesses.
Richard W. Lodge
John A. Dougherty

Inventor.
Nathaniel Lombard.
by H. E. Lodge Atty.

(No Model.) 2 Sheets—Sheet 2.
N. LOMBARD.
AUTOMATIC WEIGHING SCALE.
No. 475,405. Patented May 24, 1892.
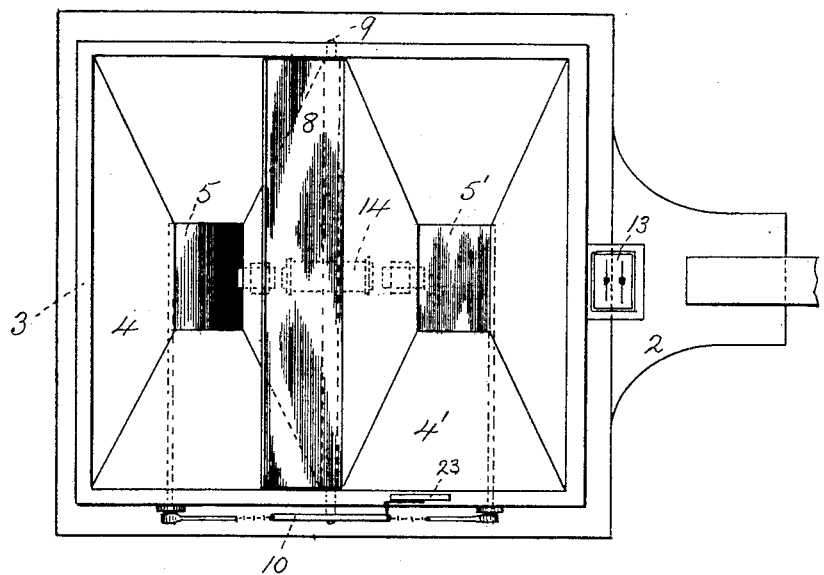
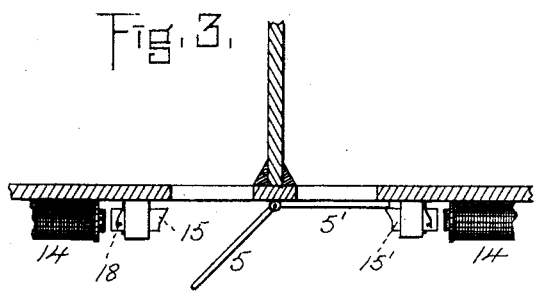
Witnesses.
Richard W. Lodge
John A. Dougherty
Inventor.
Nathaniel Lombard.
by H. L. Lodge Atty.

UNITED STATES PATENT OFFICE.

NATHANIEL LOMBARD, OF BOSTON, MASSACHUSETTS.

AUTOMATIC WEIGHING-SCALE.

SPECIFICATION forming part of Letters Patent No. 475,405, dated May 24, 1892.

Application filed December 18, 1891. Serial No. 415,503. (No model.)

*To all whom it may concern:*

Be it known that I, NATHANIEL LOMBARD, a citizen of the United States, residing at Boston, in the county of Suffolk and State of Massachusetts, have invented certain new and useful Improvements in Automatic Weighing-Machines; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to weighing-machines, more particularly such as are employed in ascertaining the weight of material in bulk, such as grain, ores, coal, or other comminuted material.

The object of my invention is to enable the material while in bulk to be weighed accurately and in such quantities, large or small, as may be practicable or desirable at the time such act is being performed.

My improvements enable the weighing to be continued so long as is required in a perfectly automatic manner, as will be hereinafter explained, and the mechanism embodying such invention is of simple construction, in order to enable it to be applied to any standard platform-scales, and, moreover, allows the material to be weighed in such predetermined quantities as is desired.

The drawings represent in Figure 1 a vertical sectional elevation of a weighing apparatus embodying my invention. Fig. 2 is a plan view. Fig. 3 is a modified construction. Fig. 4 is a detail showing the latch.

In the accompanying drawings, 2 represents a platform-scale of any standard construction, upon which is to be placed the receiving bin or receptacle 3, divided, preferably, into two compartments 4 4', open at the top, while in the bottom are discharge-apertures, which are fitted with gates 5 5', adapted to move oppositely, so that when one compartment is discharging material which has been weighed the other is closed and being filled with material the weight of which is to be ascertained.

Above the receptacle is located the feed-spout 6, connecting with some large storage-bin where the material is contained in bulk, as in grain-elevators. Said spout is provided with a slide-valve 7, and the material is intended to discharge upon an oscillating deflector-plate 8. This latter is actuated by the movements of the gates and held by them in an oblique position. The duty of said deflector is to change the direction in flow of the material alternately from one compartment to the other at proper intervals, as will be subsequently described. A horizontal pivot 9, centrally of the receptacle 3, supports said deflector, while an operating-lever 10, fast on one end, is united with the respective gates 5 5' by the bands 12 12'. Thus the movement of either gate serves to oscillate the deflector, which is so positioned that the material from the feed-spout shall be directed in that compartment the gate of which is then closed.

In connection with the above-described mechanism and in order to render the apparatus entirely automatic in connection with the platform-scales I have provided a galvanic cell at 13, which serves to excite an electro-magnet 14, and thus enables the latter at stated intervals, determined by movement of the scale-beam, to operate the latches 15 15', by means of which the gates 5 5' are held closed. Wires 16 16' extend from the cell to the electro-magnet and terminate in binding-posts 17 17'. The latter is made adjustable in order to enable the scale-beam to contact therewith and close the circuit (normally open) when the proper weight of material has been received within one of the compartments. A recording-dial 23, which may be operated by the oscillations of the deflector-lever, serves to register the number of times the compartments are filled. From this the weight of material is readily ascertained.

In the modification shown in Fig. 2 the gates are shown as connected or formed of a single bent plate. The mode of operation, however, is the same; but in this instance two electro-magnets are required, one for each latch. These latches are spring-actuated at 18, so that immediately upon the electro-magnet becoming inactive the latch returns to place in readiness to engage the gate when the latter is shut.

The operation of this apparatus is as follows, the parts being relatively as indicated in Fig. 1: For example, I will instance the weighing of oats at thirty-two pounds per bushel, the standard required. Hence the weights 20 are set upon the beam for any multiple of thirty-two, according to the capacity of the compartments 4 4'. The binding-post 17' is then adjusted so that when the desired weight, say, of fifty bushels, or sixteen hundred pounds, is attained the beam is lifted and contacts with the post 17' to close the circuit. Simultaneously the electro-magnet is excited, the latch 15' drawn back, and the gate opened to discharge the contents, while at the same moment the gate 5 is closed and locked. This movement of the gates oscillates the deflector, and the position of the latter is reversed. Such change now directs the material into the compartment 4, and the weight sixteen hundred pounds is reached, when a similar and reverse action takes place, the gate 5 now being opened, while the gate 5' is closed. This weighing process continues so long as material is delivered from the feed-spout. Suitable conductors 21 convey the material away. Upon the opening of a gate and discharge of the contents of the compartment thereof the beam drops, the circuit is opened, and the electro-magnet becomes inoperative, thus releasing the latch, which is returned to its active position by its spring in readiness to lock the gate when it becomes necessary so to do, or at the time the other gate is to be opened.

In lieu of employing an electro-magnet with a fixed pole-piece and a movable latch operated thereby a very evident modification would be to use the solenoid principle, making the movable core serve as a latch. This is a very simple matter, since upon admission of the current through the coil the core would advance within and thus release the gate precisely as is accomplished by the parts shown in the drawings.

What I claim is—

1. In weighing apparatus, the combination, with a balanced beam and a receptacle provided with two compartments, of two gates, locking mechanism therefor, a deflector operated by said gates, and electric communication between said locking mechanism and the beam to open the gates alternately and shift the deflector, substantially as specified.

2. The combination, with a platform, a balanced beam, the binding-posts, and a two-chambered receptacle supported upon said platform, of two oppositely-moving gates, holding-latches, and their operating mechanism electrically connected with the balanced beam, substantially as explained.

3. A weighing-machine, the two-chambered receptacle thereupon, and the binding-posts, one of which is adjustable with respect to the balanced beam, combined with an oscillating deflector, the pivotal gates connected with said deflector, gate-locking mechanism, and an electro-magnet in circuit with the balanced beam, all operating substantially as stated and described.

In testimony whereof I affix my signature in presence of two witnesses.

NATHANIEL LOMBARD.

Witnesses:
H. E. LODGE,
JOHN A. DOUGHERTY.